2 Sheets—Sheet 1.
E. NORTON.
Soldering Cans.
No. 233,688. Patented Oct. 26, 1880.
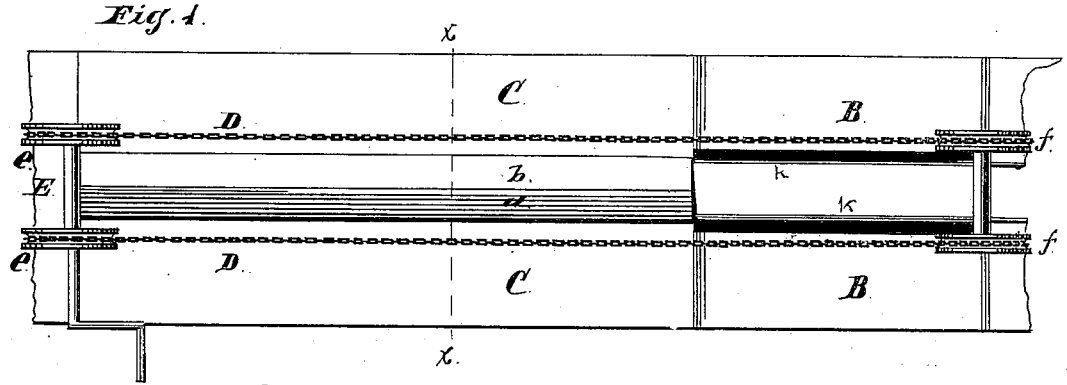
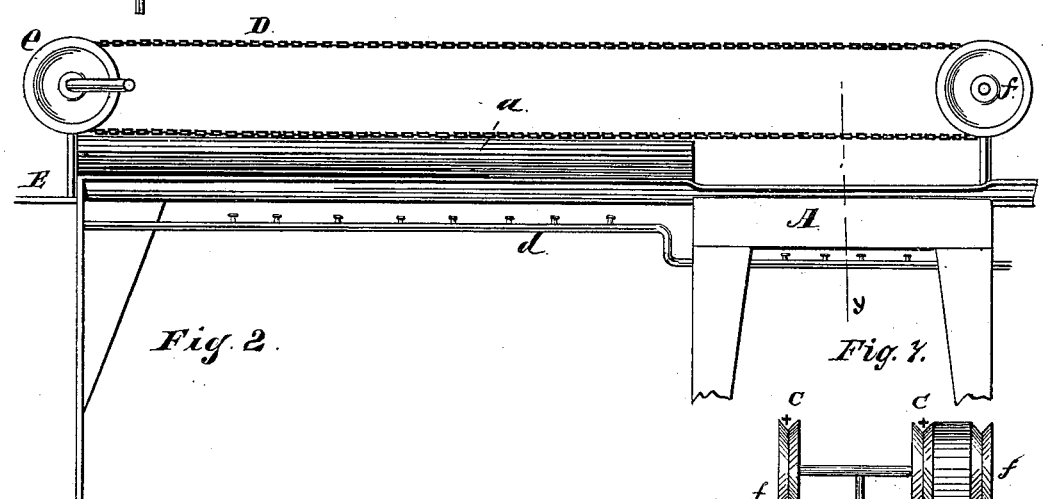
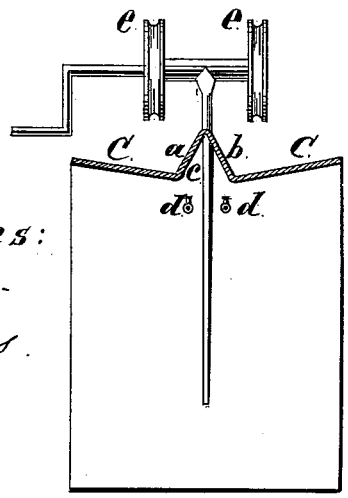
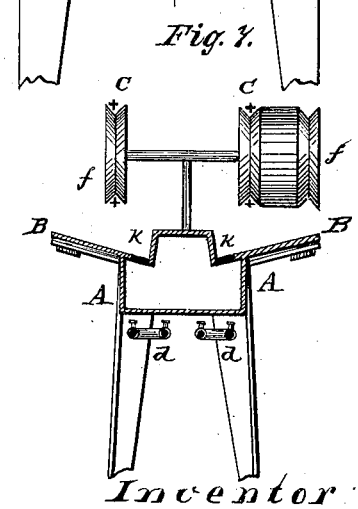
Witnesses:
O. W. Bond.
L. F. Bruns.
Inventor:
Edwin Norton
By West & Bond
Attys 2 Sheets—Sheet 2.
E. NORTON.
Soldering Cans.
No. 233,688. Patented Oct. 26, 1880.
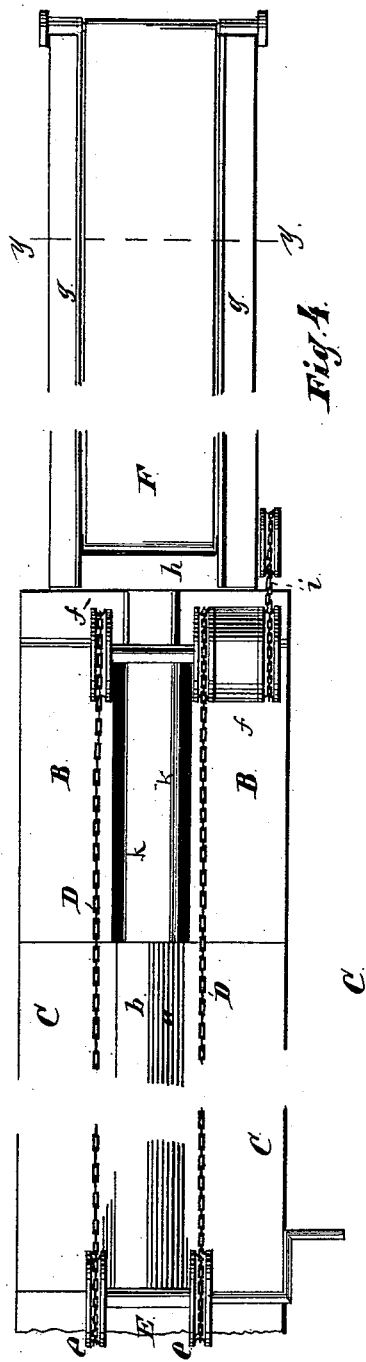
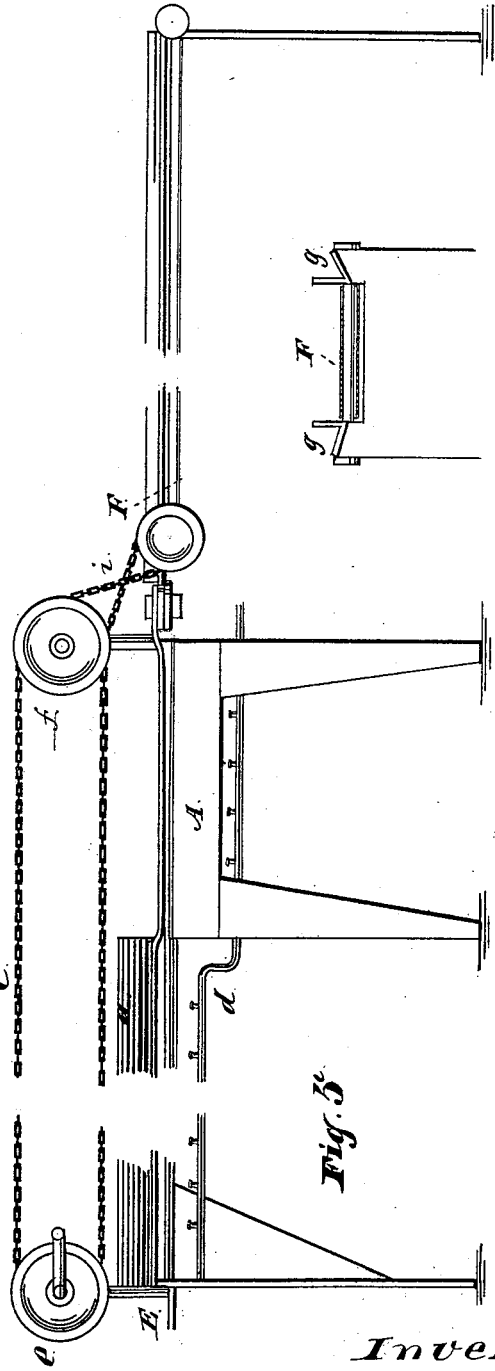
Witnesses:
Inventor:
Edwin Norton
By West & Bond
Attys

UNITED STATES PATENT OFFICE.

EDWIN NORTON, OF CHICAGO, ILLINOIS.

SOLDERING CANS.

SPECIFICATION forming part of Letters Patent No. 233,688, dated October 26, 1880.

Application filed October 22, 1879.

*To all whom it may concern:*

Be it known that I, EDWIN NORTON, of Chicago, Cook county, State of Illinois, have invented a new and useful Improvement in Soldering Cans, of which the following is a full description, reference being had to the accompanying drawings, in which—

Figure 1 is a plan, showing the heating and soldering devices. Fig. 2 is a side elevation of the same. Fig. 3 is a cross-section at line $x$ of Fig. 1. Fig. 4 is a plan, showing devices for removing the cans after they have been soldered, in connection with the devices shown in Fig. 1. Fig. 5 is a side elevation of the same. Fig. 6 is a cross-section at $y$ of Fig. 4; and Fig. 7 is a cross-section on line $y$ of Fig. 2.

Machines have been made for soldering the ends upon cans, by means of which the cans are rolled along upon an inclined table having a slot located over a solder-bath, the several parts being so arranged that the edge of the can passes through such bath. Heretofore the cans have been cold when brought to the bath, and it has been found that the soldering is not uniformly perfect, and many of the cans so soldered are not suitable for those purposes which require air-tight cans.

The objects of my invention are to overcome this difficulty and to provide means for automatically removing the cans after they have passed through the bath. The first-named object I accomplish by heating the cans before applying them to the bath, which can conveniently be done by means of devices hereinafter described. The second object I accomplish by means of an endless carrier combined with the solder-bath.

In the drawings, A is a solder-bath. B B are two inclined platforms or tracks over the bath, along which the cans are rolled. The two heavy dark lines $k\,k$ in Figs. 1 and 4 indicate two slots or openings over the bath, through which the edges of the cans reach the solder. These devices are substantially the same as those shown in Letters Patent No. 178,642, dated June 13, 1876, to W. H. I. Howe, except that I have shown two platforms and slots instead of one. A chain to move the cans over the track is also shown in said patent.

I will now describe the devices shown in the drawings, by the use of which the cans may be heated before passing into the bath.

C C represent two platforms or tracks inclined toward the center. $a\,b$ are flanges, one upon the inner edge of each table or track. The upper edges of these flanges are secured together, and beneath and between there is a space, $c$. $d$ are gas-tubes located beneath the space $c$. They are provided at suitable intervals with openings for the escape of gas.

D D are two endless chains running over pulleys $e\,f$. The tables C C may be of any suitable length—say about ten feet—and they are to be so arranged that cans will readily pass along them to the tracks B B. In use the two tables or tracks B C may be continuous. The chains are used to move the cans over the tracks. The pulleys over which the chains pass can be made so as to be adjustable vertically, as may be required for cans of different sizes.

E is a table, from which the cans can be fed by an attendant to the machine. It may be connected with the machine or may be detached therefrom.

I now describe my devices for removing the cans after they have been soldered.

F represents an endless apron or belt, arranged in a suitable frame, upon which the cans are delivered as they pass from the solder-bath. $g$ are the side bars of such frame, between which the carrier is placed. $h$ is a shelf which fills the space between the bath and the carrier. This carrier passes over suitable rollers at each end, and such number of idlers may be used as is necessary. It is driven, as shown, by a chain, $i$.

In use the flanges $a\,b$ are to be heated by means of gas-jets from the pipes $d$, or in other suitable manner. Cans are to be fed to the machine at the outer end of the tables or tracks C C, being placed under the chains D, and with the ends which are to be heated and soldered in contact with one of the flanges, $a$ or $b$; then, the chains being in motion, the cans will be carried by the chains the whole length of the tables C C, and will be heated during such passage, and will be delivered upon the tracks B B hot, and will be rotated through the solder-bath. Thus the cans will pass to the bath hot instead of cold, and the solder will be applied more evenly, and each can will be perfectly soldered, the solder entering and filling the seam of a hot can much more readily and perfectly than that of a cold one.

The cans will be delivered from the bath upon the carrier F, which will deliver them at outer end thereof. By the use of the carrier the cans will be removed rapidly and without any jarring, and the solder will have time to cool before the cans receive any shock.

The belt F may be about thirty feet long, or longer, if desired.

I do not limit myself to the devices shown for heating the cans, but find them cheap and efficient. Single tracks may be used instead of tracks on each side.

The machine is to be made of metal.

What I claim as new, and desire to secure by Letters Patent, is as follows:

1. As an improvement in the process of soldering round cans, the rolling of the can with its end against a heating-surface and continuing the rolling through a solder-bath, whereby the operation of the bath is rendered more certain and complete, substantially as specified.

2. A table or track, C, provided with a close flange, $a\ b$, for the bottom of a can to rest against, in combination with devices for heating the table, and a solder-bath, substantially as specified.

3. The carrier F and the guides $g$, in combination with the bath-platform B, for receiving the cans and carrying them out of the way, allowing them to become sufficiently cold to permit handling, and without jarring, substantially as described.

4. The combination of the table or track C, provided with the heat-confining flange $a\ b$, solder-bath A, with the rolling chains D and carrier F, substantially as set forth and shown.

5. In a soldering apparatus, the combination of a heater having one or more faces, one or more rests or guides, and one or more endless belts, the said elements being arranged for joint operation.

EDWIN NORTON.

Witnesses:
E. A. WEST,
O. W. BOND.